Feb. 10, 1931.  K. E. PEILER  1,791,636
APPARATUS FOR FEEDING MOLTEN GLASS
Filed June 10, 1926
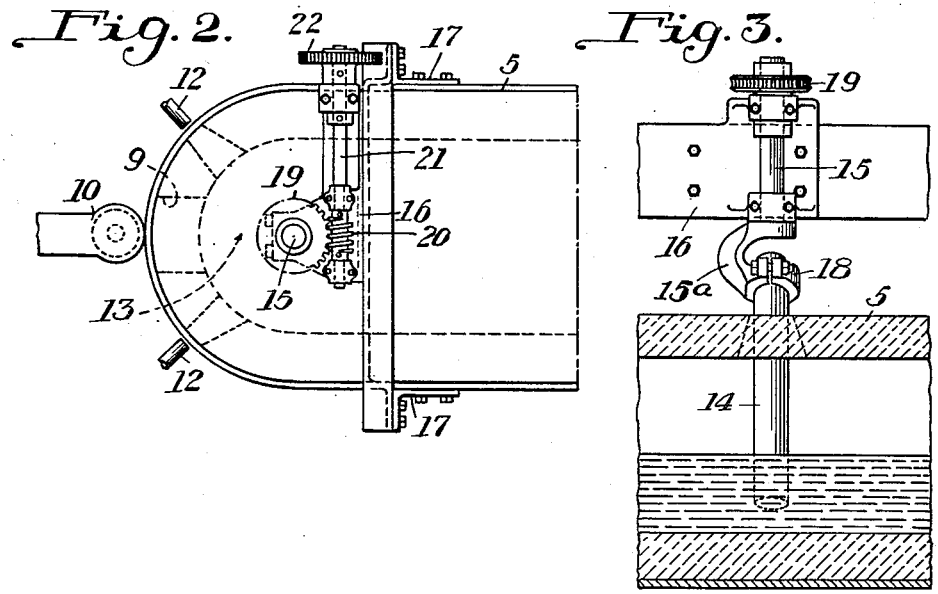
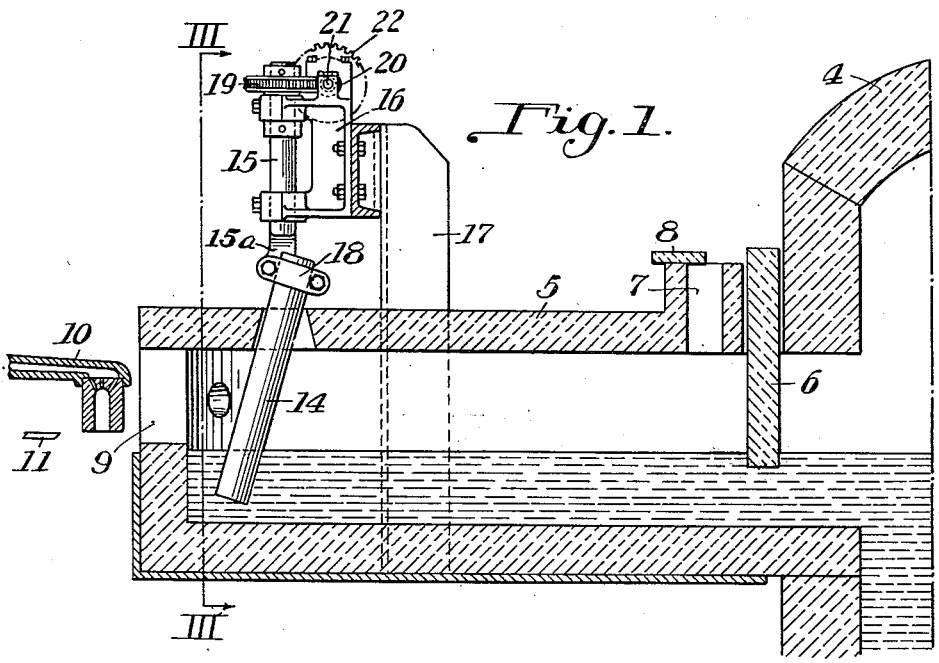
INVENTOR
KARL E. PEILER
BY Robson D. Brown
Attorney Patented Feb. 10, 1931

1,791,636

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

APPARATUS FOR FEEDING MOLTEN GLASS

Application filed June 10, 1926. Serial No. 114,883.

My invention relates to a method and apparatus for feeding mold charges of molten glass by gathering from the surface of a body of molten glass contained in a gathering pool or forehearth. It is particularly adapted for use in connection with glass gathering devices employing a gathering receptacle, transfer cup or mold which is filled by suction from the surface of a pool.

When a mold charge of molten glass is gathered from a pool of glass by a suction gatherer, or by similar means, the surface of the glass at the gathering station is chilled by contact with the relatively cold gathering means and with such shearing means as are employed to sever the mold charge from the body of glass in the pool. The surface of the glass at the gathering station is also chilled by the exposure caused by the opening which is needed for entrance of the gathering means. These chilled portions of glass would ordinarily be gathered up by the gathering means in gathering subsequent charges, causing defects or blemishes in the charge, which would appear as defects in ware made therefrom. The chill would also interfere with subsequent gathering operations and might even prevent gathering.

My invention has for its object the removal of the chilled surface of glass from the gathering station and the replacing of such chilled glass with hot glass, by causing a circulation or movement of glass, and particularly of the surface glass, past the gathering station, in a gathering pool or forehearth of proper proportion and with proper temperature regulating means. A further object is the reheating of the chilled glass by subjecting it to a suitable environment. Still another object is to provide a suitable gathering pool or forehearth from which mold charges may be gathered. These and other objects will be apparent from the following description.

The present invention is characterized by the use of an inclined implement that is moved so as to describe a cone, the lower end of the implement being thereby given a circular motion which moves glass past the point at which the glass is gathered. This construction is simple and inexpensive, requires only a small opening in the cover of the gathering pool, and may be operated by very simple mechanism. This application is related to my copending applications for Letters Patent Serial Numbers 114,881 and 114,882, both filed on the same day as the present application, and my co-pending application for patent, Serial No. 114,089, filed June 7, 1926.

In the accompanying drawing, Figure 1 is a longitudinal vertical sectional view of mechanism for practicing my invention; Fig. 2 is a plan view of a portion of the apparatus of Fig. 1; and Fig. 3 is a fragmentary vertical sectional view taken on the line III—III of Fig. 1.

A portion of a glass furnace is represented by the numeral 4 and a forehearth by the numeral 5. Passage of gases from the furnace to the forehearth is prevented by a partition 6 and flow of gases from the forehearth 5 is controlled by a stack 7 and a damper 8. Burners 12 are provided for maintaining the proper temperature within the forehearth 5, and additional burners may be provided as desired.

The forehearth is provided at its forward end with an opening 9 through which a suction gatherer 10 may be inserted to gather glass at the point 13. This gatherer is provided with shearing means 11 to sever the gathered mass from the glass in the forehearth. The suction gatherer and the shear are shown somewhat diagrammatically, since they may be manipulated in any well-known manner, the gatherer being first projected horizontally into the forehearth over the gathering point 13 and then lowered into contact with the glass after which suction is applied to the cavity of the gatherer to fill it with glass. The gatherer may then be raised and the shearing means operated to sever the glass, after which the gatherer may be withdrawn from the forehearth to a discharging position where it may discharge its gather or charge of glass into a forming mold.

For the purpose of moving glass past the gathering point 13, I provide an inclined implement 14, of refractory material, that extends through a conically tapered opening in the roof of the forehearth. Since the implement 14 is so moved as to describe a cone, the opening through the roof need be of only slightly greater diameter at its narrowest width than the diameter of the implement. The implement 14 is supported from a vertical shaft 15 that is mounted in a bearing bracket 16 which extends across the forehearth and is supported at its ends upon posts 17. The shaft 15 carries at its lower end a goose-neck 15a provided with an angularly disposed chuck for detachably holding the implement 14 and permitting the implement to be adjusted vertically so as to vary the depth to which it extends into the molten glass. The goose-neck 15a may be made somewhat longer than it is shown on the drawing, so as to permit easier removal of the implement 14.

The implement 14 is revolved about the axis of the shaft 15 by mechanism including a worm wheel 19 secured to the upper end of the shaft 15 and driven by a worm 20 secured to a shaft 21 which is supported by the bearing bracket 16 and carries at its outer end a gear 22, which is driven from any suitable source of power.

As the implement revolves, its lower end describes a circle which may pass through the gathering point 13 or may be wholly behind the gathering point. If the gathering is done outside of the circle described by the implement in the glass, it is not necessary to synchronize the motion of the implement with that of the suction gatherer. If, however, the gatherer is moved in far enough to intersect the path of the implement, then the motion of the implement should be synchronized with that of the gatherer. In this case it is preferred that the implement make one revolution for each gather, moving past the gathering point immediately after the removal of the gatherer. If desired, the gatherer and the implement may be synchronized so that the gatherer makes two or even more gathers for each rotation of the implement so long as the gatherer is not permitted to strike the implement. The synchromizing is accomplished by connection with the drive for the implement shown in the drawing. In view of the presence of the partition 6 and the location of the implement 14 at the front end of the forehearth, it will be obvious that the glass will be circulated in an endless path confined within the forehearth and that chilled bits of glass will not be returned to the melting tank, but will be reheated in the forehearth by the heat therein.

It will be seen that the motion of the implement 14 sets up a movement of glass past the gathering point which causes the chilled portion of glass left by each gathering operation to flow rearwardly and become reheated, and that, in case the gathering point is in the path of the implement, the chilled glass is positively removed from the gathering point by the implement.

Modifications in the structure herein shown and described may be made within the scope of the appended claims.

I claim as my invention:

1. Apparatus for circulating molten glass, which comprises an implement and a rotatable shaft to which one end of said implement is connected, the said implement being inclined with respect to the axis of said shaft.

2. Apparatus for circulating molten glass, comprising an implement, and means for rotating said implement about a fixed axis, the implement being inclined with respect to said axis.

3. Apparatus for circulating molten glass, compising an implement mounted in inclined position and dipping into a body of molten glass, a vertical shaft connected to the upper end of said implement, and means for rotating said shaft to swing the lower end of the implement bodily in a circle in said glass.

4. The combination with a container for molten glass and a cover therefor having an opening, of an implement extending through said opening in an inclined direction into the glass in the container, and a rotatable support to which the upper end of said implement is connected, the axis of said support being vertical.

5. The combination with a container for molten glass and a cover therefor having an opening, of an implement extending through said opening in an inclined direction into the glass in the container, and a rotatable support to which the upper end of said implement is connected, the said support having a vertical axis co-axial with said opening.

6. The combination with a container for molten glass and a cover therefor having an opening, of an implement extending through said opening in an inclined direction into the glass in the container, and a rotatable support to which the upper end of said implement is connected, the axis of said support being vertical and in alignment with the center of said opening, said opening in the cover having an area at its upper end slightly larger than the cross sectional area of the adjacent portion of the implement and then enlarging regularly in cross section toward its lower end.

7. The combination of a container for a supply body of molten glass presenting a gathering area, an elongated implement located partly over the glass in the container and partly continuously immersed in the glass, and means for effecting a continuous relative movement of said implement as a whole and said container to cause the glass contacting portion of the implement to describe a substantially circular figure, the center of which is located out of alignment with the axis of said implement.

8. The combination of a glass melting tank, an extension of polygonal shape formed on said tank for containing a pool of glass to which glass is supplied by said tank, said extension having an imperforate bottom, means for successively gathering charges of glass from the surface of said pool in a gathering zone adjacent one end of said pool, a stirring implement projecting into the pool of glass in said extension, said implement having a glass engaging portion of solid cross section contacting with only a relatively small portion of the glass in said pool at any one time to prevent undue chilling thereof by the implement, and means for automatically rotating the implement in the glass to circulate the glass away from and toward the gathering zone in a closed path, and means for confining said path within said extension, whereby chilled portions of glass produced by the successive gathering operations are removed from the gathering zone, and are reheated and reassimilated in said pool.

9. Apparatus for feeding molten glass comprising a glass melting tank, a forehearth connected to said tank, a channel between said tank and said forehearth through which glass flows from the tank to provide a pool of glass in the forehearth from the surface of which charges are removed by an implement which is dipped into contact with the glass, a partition adjoining said channel for separating the space above the heated glass in the forehearth from the heated space above the glass in the tank, and for separating surface glass in the pool from surface glass in the tank, means comprising a stirring implement for circulating the glass in a closed orbital path confined to the forehearth by said partition and passing through the gathering zone, whereby chilled glass produced by the gathering operation is removed from the gathering zone, and means for heating the glass in the forehearth independently of the heating of the glass in the tank.

10. In combination with a glass container, a cover for said container, a stirring implement extending through said cover, and means for swinging said implement to impart a greater amplitude of movement to the glass contacting portion thereof than to its upper portion, to circulate the glass in said container, said cover comprising means surrounding a swinging portion of said implement for restricting the loss of heat through said cover where the implement passes through it.

11. In combination with a glass container, a cover for said container, a stirring implement extending through said cover, means for swinging said implement to impart a greater amplitude of movement to the glass contacting portion thereof than to its upper portion, to circulate the glass in said container, the structure of the cover surrounding said implement providing an opening having a slightly greater area at its lower end than at its upper end, to restrict the loss of heat through said cover where the implement passes through it.

12. Apparatus for supplying molten glass and for gathering charges therefrom, comprising a glass melting furnace, a forehearth connected to said furnace, means for conducting glass from the furnace to the forehearth to provide a pool therein, said forehearth having an opening formed therein for exposing a gathering zone in said pool, a gathering receptacle adapted to be dipped into the glass in said gathering zone periodically to remove charges of glass from the surface thereof, an implement for circulating the glass in said gathering pool whereby chilled portions of glass produced by the gathering operation are removed from the gathering zone, a partition extending into the glass for confining the circulation of the glass at least on the surface of the pool to said forehearth and operating to prevent chilled glass from passing from the forehearth to the furnace, said partition extending from the surface of the glass to the top of the forehearth to separate the heating spaces above the glass in the forehearth and the glass in the furnace, and means associated with the forehearth for locally heating the pool of glass therein and for causing the chilled glass produced by the gathering operation to be reheated and reassimilated with the glass in the gathering pool.

Signed at Hartford, Conn., this 7th day of June, 1926.

KARL E. PEILER.